(12) United States Patent
Guindi et al.

(10) Patent No.: US 11,035,209 B2
(45) Date of Patent: Jun. 15, 2021

(54) METHOD AND SYSTEM FOR CONTROLLING DOWNHOLE PUMPING SYSTEMS

(71) Applicant: Magnetic Pumping Solutions, Hampshire (GB)

(72) Inventors: Ramez Guindi, Houston, TX (US); Georgios Orfanoudakis, Heraklion (GR); Michael Yuratich, Hamble (GB)

( * ) Notice: Subject to any disclaimer, the term of this patent is extended or adjusted under 35 U.S.C. 154(b) by 0 days.

(21) Appl. No.: 16/966,300

(22) PCT Filed: Feb. 4, 2019

(86) PCT No.: PCT/US2019/016489
§ 371 (c)(1),
(2) Date: Jul. 30, 2020

(87) PCT Pub. No.: WO2019/152915
PCT Pub. Date: Aug. 8, 2019

(65) Prior Publication Data
US 2020/0370400 A1  Nov. 26, 2020

Related U.S. Application Data

(60) Provisional application No. 62/625,391, filed on Feb. 2, 2018.

(51) Int. Cl.
| E21B 43/12 | (2006.01) |
| F04B 49/06 | (2006.01) |
| F04D 15/00 | (2006.01) |
| H02P 21/00 | (2016.01) |

(52) U.S. Cl.
CPC .......... *E21B 43/128* (2013.01); *F04B 49/065* (2013.01); *F04D 15/0066* (2013.01); *H02P 21/0003* (2013.01); *F04B 2203/0209* (2013.01); *F04B 2205/05* (2013.01)

(58) Field of Classification Search
CPC ...... F04D 13/08–13/10; F04D 15/0066; F04B 49/065; F04B 2203/0209; F04B 2205/05; E21B 43/128; E21B 43/12; E21B 43/38; H02P 21/00; H02P 21/0003; H02P 21/13; H02P 21/14; H02P 21/36; H02P 7/2805
USPC ..... 166/68; 318/400.02, 461, 599, 432, 434, 318/609, 610
See application file for complete search history.

(56) References Cited

U.S. PATENT DOCUMENTS

| 5,427,079 A | 6/1995 | Andrepont, Jr. et al. |
| 6,167,965 B1 * | 1/2001 | Bearden ................ E21B 43/385 |
| | | 166/250.15 |
| 7,668,694 B2 * | 2/2010 | Anderson ................ G05D 9/12 |
| | | 702/182 |
| 2004/0062658 A1 | 4/2004 | Beck et al. |

(Continued)

FOREIGN PATENT DOCUMENTS

| WO | 2017076939 A1 | 5/2017 |
| WO | 2017106865 A1 | 6/2017 |

*Primary Examiner* — Philip E Stimpert
(74) *Attorney, Agent, or Firm* — Matthew J Patterson

(57) ABSTRACT

An apparatus and method for controlling a downhole pumping system is disclosed. The apparatus is capable of detecting motor operating conditions and pump operating conditions thereby and includes control systems for utilizing the motor operating conditions to control the operation of the downhole pumping system.

12 Claims, 7 Drawing Sheets

(56) References Cited

U.S. PATENT DOCUMENTS

| | | |
|---|---|---|
| 2005/0252205 A1* | 11/2005 | Stavale ............... F04D 15/0066 |
| | | 60/445 |
| 2008/0067116 A1* | 3/2008 | Anderson ........... F04D 15/0066 |
| | | 210/100 |
| 2008/0288115 A1 | 11/2008 | Rusnak et al. |
| 2011/0103974 A1 | 5/2011 | Lamascus et al. |
| 2011/0138816 A1 | 6/2011 | Takeda et al. |
| 2011/0223038 A1 | 9/2011 | Ogawa et al. |
| 2012/0027630 A1 | 2/2012 | Forsberg et al. |
| 2012/0100014 A1 | 4/2012 | Seitter |
| 2016/0265321 A1 | 9/2016 | Elmer |
| 2017/0138159 A1* | 5/2017 | Hoyte .................... H02P 21/00 |

* cited by examiner

METHOD AND SYSTEM FOR CONTROLLING DOWNHOLE PUMPING SYSTEMS

CROSS REFERENCE TO RELATED APPLICATIONS

This application claims the benefit of U.S. Provisional Patent Application Ser. No. 62/625,391 filed 2 Feb. 2018 as well as Patent Cooperation Treaty Patent Application Serial No PCT/US19/16489 filed 4 Feb. 2019. The disclosure of the applications above are incorporated herein by reference in their entirety.

BACKGROUND OF THE INVENTION

Field of the Invention

The present disclosure relates to downhole pumping systems, reliable operation of electric submersible pumps (ESPs), and particularly in reference to methods for detecting gas in an ESP and controlling the motor to prevent the deleterious effects of gas on a downhole pumping system.

Description of the Related Art

Downhole pumping systems are a widely used method of artificial lift, whereby a pump and electric motor deployed in a borehole is used to bring liquid and gas to surface. Artificial lift is necessary when the natural well pressure is insufficient to do so by itself. The motor is powered via a length of electric cable rising to surface and thence connected to control equipment.

Referring to FIG. 1, there is shown a typical downhole pumping system installed in a wellbore. As is known, a borehole drilled in an earth formation 1 may be lined with casing 2 cemented to the surrounding formation. A motor 10 is coupled to a pump 12 via a motor seal 11. The pump discharge end 13 is attached to production tubing 3. Production fluid (not shown) enters the well via perforations 4 in the casing 2 and enters the pump at its intake 14. The production tubing 3 runs up the borehole through the wellhead 6 and on to surface production facilities. In a typical installation, motor 10 comprises a three-phase motor and is powered via a three-conductor electric cable 15, which runs up to surface alongside and clamped to the production tubing 3 in a manner well known in the art. The cable 15 then penetrates through the wellhead 6 and runs to a vented junction box 20. In the embodiment shown, surface electric power 21 is converted by drive unit 22 to a frequency and scaled voltage needed by the motor 10, allowing for voltage drop in the cable. The scaled voltage is then increased to the actual voltage needed by the motor 10, by step-up transformer 23. The output of the transformer 23 is connected in the vented junction box 20 to the motor cable 15. In other embodiments, older installations for example, drive unit 22 may simply comprise a switch-board that passes the supply voltage directly to the transformer via a controllable contactor and protective fuses. In the current area of art, drive unit 22 is preferably a variable speed drive as this permits optimization of production and energy savings. A variable speed drive is in any case required for permanent magnet motors (PMMs) due to the need for synchronous control. A control unit 24, whether separate or incorporated within the drive unit 22, may be used to stop and start the motor and potentially to reverse the motor direction by switching phase connections electronically.

The predominant prior art method for controlling downhole AC motors using variable speed drives is scalar control, which only adjusts the magnitude and frequency of the voltages applied to the motor. Scalar control variants typically do not require knowledge of the motor's shaft angular position and speed. For synchronous motors, permanent magnet motors (PMMs) in particular, these methods assume that the motor is running at the synchronous speed which is determined by the drive output frequency, and are unreliable in that they easily lose control. Another method of controlling AC motors (and downhole pumping systems thereby) is vector control. As opposed to scalar control, vector control methods usually require knowledge of the shaft angular position and speed, which for downhole motors is typically provided by an observer, also known as an estimator. An observer typically comprises an electrical model of the motor, surface measurements of voltage and current and a phase-locked loop (PLL). A PLL can be digitally-implemented in the form of an algorithm, providing an estimate of the phase and frequency of a periodic input signal such as the drive output voltage or current. Control methods using such observers are known as sensorless in that they do not require physical shaft rotation sensors. They are particularly useful for downhole applications, where the motors are positioned remotely from the drives that control them. These methods adjust the drive output voltage on a pulse-by-pulse basis, thus more accurately controlling all characteristics of the motor voltage and current waveforms, and hence its speed and torque. Not all vector control drives employ observers directly, but sensorless vector drives share the use of a motor model and surface electrical measurements to accurately control the torque-producing component of the motor current. For a PMM this is sensibly the actual motor current whereas for induction motors the motor current also contains a magnetizing current component. In general, vector controls are fast and accurate controllers that tightly regulate the torque-producing motor current, herein referred to as "stiff" current control (and sometimes referred to as hard current control), with or without an observer, and may be applied to both induction motors and permanent magnet motors.

ESPs, or centrifugal pumps, are from the family of hydrodynamic pumps including such known types as radial flow, mixed flow, axial flow and helico-axial flow which generally operate at speeds of thousands of revolutions per minute and obey the known affinity laws which relate shaft speed to torque and fluid head. They are made in multiple stages, often more than one hundred, and have a relatively open path to fluid throughout their length.

When a pump 12 is operating in a well, it is boosting the well inflow pressure to the pressure needed to lift the fluid to surface. ESPs encounter deleterious effects in the presence of a high percentage of gas such as head degradation and gas lock up. In some prior art ESP embodiments, a gas separator is positioned between the seal and the pump. Fluid enters the gas separator before going into the pump and the separator expels much of the gas into the wellbore. However, this is not a complete solution as it is known that reduced performance and gas lock-up can occur in the presence of sufficient amounts of gas bubbles in the fluid. It is important to prevent the deleterious effects of gas that accompany the aforementioned performance issues. Gas in the pump can reduce the lubrication and hydrodynamic lift available to the bearings, leading to seizure. Gas passing over the motor on the way to the pump inlet needs to be cleared quickly, as it reduces motor cooling and could lead to overheating and component failure. This is especially true in embodiments that include induction motors. Although the pump torque reduces when the pump contains gas, so reducing the motor load, induction motors continuously generate a substantial amount of heat arising from their fixed magnetising current and friction from their small rotor-stator clearance. Failure to resolve a gas-locked ESP can result in overheating and premature failure of equipment including cable 15 where it passes an overheated pump.

In some prior art embodiments, drive 22 includes monitoring of the current of the motor 10 to determine if gas is present in the pump 12. If gas is present in the pump 12 the motor 10 will draw less current and when it reaches a low enough point, as determined by a minimum threshold set in drive 22, the motor is stopped. While stopped the column of fluid above pump 12 drains back downhole and releases the gas from the pump into the wellbore. Motor 10 is then restarted after a sufficient period has elapsed. This type of intervention can be helpful in preventing harm to the components of the pumping system but it results in a significant loss of production.

In other prior art embodiments employing induction motors with scalar control drives, the motor current is regulated. A scalar drive outputs a voltage proportional to a set frequency. A known proportional-integral controller is used to adjust the set frequency in accordance with the error (difference) between set current and actual motor current. The objective is to maintain the pump torque by holding the motor current steady. If gas enters the pump, the required torque and hence motor current will reduce, making the current error positive. The controller will react by increasing the set frequency and hence pump speed, until the error reduces to sensibly zero. The increased speed will help increase the pump head to overcome the head degradation caused by the gas. Ideally this will allow it to maintain some fluid production while passing gas up through the pump and avoiding gas lock. For brevity in the present disclosure this process will be termed flushing of gas up through the pump. For an induction motor the current is not proportional to torque, due to a large magnetizing current component. This makes it a relatively insensitive indicator of gas starting to enter the pump, particularly if the motor is not heavily loaded in normal conditions since the current decrease is small. This makes it difficult to configure the control for reliable and timely operation.

In other prior embodiments, sensors are mounted in proximity to the downhole components. Such sensors can include temperature sensors, gas detectors, resistivity sensors, flow meters, accelerometers and vibration sensors. Using these sensors, such systems detect operating parameters relating to gas build up and lock-up in the pump. One such embodiment is set forth in United States Patent Application US20120027630 and in one particular embodiment uses vibration as an indicator of the presence of gas and controls the speed of the motor to reduce the effects of gas on the system. Such systems that utilize downhole sensors can be unreliable and can lose the ability to control the pump in the presence of gas if a sensor fails or there are communications errors. The communications bandwidth of downhole sensors is generally very low, so that measurement updates may only arrive every 10 or 20 seconds. It should be recognized by those skilled in the art that this may not be fast enough to prevent pump bearing damage.

For at least the reasons stated herein before, it is desirable to control a pump in the presence of gas to prevent gas lockup. There is clearly a need for an improved means of detecting the presence of gas in a pump and acting on it promptly and reducing the deleterious effects caused thereby including damage to components, stoppage time and restarting.

SUMMARY OF THE INVENTION

In accordance with some aspects of the present disclosure, systems and methods related to a novel artificial lift system are disclosed.

A system of one or more computers can be configured to perform particular operations or actions by virtue of having software, firmware, hardware, or a combination of them installed on the downhole pumping system that in operation causes or cause the downhole pumping system to perform the actions. One or more computer programs can be configured to perform particular operations or actions by virtue of including instructions that, when executed by data processing apparatus, cause the apparatus to perform the actions. One general aspect includes a downhole pumping system that includes a pump, a motor configured to operate the pump, a variable speed drive including a vector current controller configured to control an operation of the motor, an observer configured to provide an estimate of at least one operating parameter of the motor, a regulating unit configured to receive a current of the motor and to monitor the estimate of at least one operating parameter of the motor, where the regulating unit is configured to communicate a signal to the vector current controller and where the variable speed drive is configured to control the operation of the motor based on the signal from the regulating unit. Other embodiments of this aspect include corresponding computer systems, apparatus, and computer programs recorded on one or more computer storage devices, each configured to perform the actions of the methods.

Implementations may include one or more of the following features. The downhole pumping system where the observer further includes an electrical model of the motor and where the estimate of at least one operating parameter of the motor is a speed of the motor. The downhole pumping system where the signal is any of a normal operation signal, a maximum speed signal, a minimum speed signal, a maximum current signal and a minimum current signal. The downhole pumping system where the maximum speed signal, the minimum speed signal, the maximum current signal and the minimum current signal define a time-limited performance zone and where the variable speed drive is configured to control the motor within the time-limited performance zone. The downhole pumping system where the regulating unit is configured to trigger an alarm if any one of the minimum current signal, the maximum current signal the minimum speed signal and the maximum speed signal is communicated is communicated for greater than a predetermined period of time. The downhole pumping system where the regulating unit includes: an average current controller configured to receive a set average current signal and to produce a set speed signal, a speed controller configured to receive the set speed signal and the speed of the motor and to produce a set hard current signal, and a filter configured to receive the set hard current signal and to produce a filtered current signal and to communicate the filtered current signal to the average current controller, and where the speed controller is configured to communicate the set hard current signal to the vector current controller. The downhole pumping system where the average current controller includes a minimum speed limit and a maximum speed limit, and where the speed controller includes a minimum current limit and a maximum current limit. The downhole pumping system where the variable speed drive is configured to control the operation of the motor within any of the minimum speed limit and the maximum speed limit, the minimum current limit and the maximum current limit. The downhole pumping system where the variable speed drive is configured to stop the motor if the alarm is triggered. The downhole pumping system where the motor includes a permanent magnet motor. The downhole pumping system where the filter is configured to receive a direct current measurement and to produce a filtered direct current signal and to communicate the filtered direct current signal to the average current controller. The downhole pumping system where the variable speed drive is further configured to control the motor at any of a purge speed and a park speed. The downhole pumping system where the average current controller and the speed controller are included of a proportional-integral type controller. The downhole pumping system where the variable speed drive is configured to control the operation of the motor based on the signal from the regulating unit in any one of a current control mode, a speed control mode and a power control mode. The downhole pumping system where the variable speed drive is configured in the speed control mode to control the operation of the motor in any of a normal speed, a purge speed cycle and a park speed cycle. The downhole pumping system where the estimate of at least one operating parameter of the motor is any of a speed of the motor, a current of the motor, and a torque producing current of the motor. The downhole pumping system further including at least one sensor configured to provide information about an operating parameter of the downhole pumping system to the variable speed drive and where the variable speed drive is configured to control the operation of the motor based on the information about the operating parameter. The downhole pumping system where the at least one sensor is a pressure sensor system and where the operating parameter is a differential pressure across the pump and where the information relates to any of a density and a flow rate of a fluid. Implementations of the described techniques may include hardware, a method or process, or computer software on a computer-accessible medium.

One general aspect includes a method of operating a downhole pumping system that includes a pump, a motor and a variable speed drive wherein the method includes setting a time-limited performance zone for the operation of the motor; monitoring at least one operating parameter of the motor; inserting the time-limited performance zone and the operating parameter into the variable speed drive; controlling the motor in accordance with the time-limited performance zone and the at least one operating parameter. Other embodiments of this aspect include corresponding computer systems, apparatus, and computer programs recorded on one or more computer storage devices, each configured to perform the actions of the methods.

Implementations may include one or more of the following features. The method further including setting a plurality of operating limits of the motor, inserting the plurality of operating limits of the motor into the variable speed drive, and where controlling the motor further includes controlling the motor in accordance with any of the plurality of operating limits. The method further including stopping the motor if the at least one operating parameter of the motor exceeds the time-limited performance zone. The method where controlling the motor further includes controlling the motor in a current control mode. The method where controlling the motor in a current control mode further includes: setting an average current and inputting the average current into a current controller, outputting set speed signal and inputting the set speed signal into a speed controller, outputting a set hard current signal and inputting the set hard current signal into a vector current controller and producing a vector current value, inserting the vector current value into the variable speed drive, inputting the set hard current into a filter and producing a filtered set hard current, inserting the filtered set hard current into the current controller, and where controlling the motor further includes controlling the motor using the vector current value. The method where controlling the motor further includes controlling the motor in a speed control mode. The method where controlling the motor further includes controlling the motor in a power control mode. The method where controlling the motor in a power control mode further includes controlling the motor in any of a normal speed mode, a purge speed mode a park speed modem an alarm mode and a restart mode. Implementations of the described techniques may include hardware, a method or process, or computer software on a computer-accessible medium.

BRIEF DESCRIPTION OF THE DRAWINGS

So that the manner in which the above-recited features of the present disclosure can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

The present disclosure addresses the many issues raised hereinbefore using a systematic electrical method and apparatus. The component parts and methods may variously be used in sequence or independently while remaining within the scope of the invention. However, integration within other pieces of equipment, in particular a variable speed drive.

Figure 1:
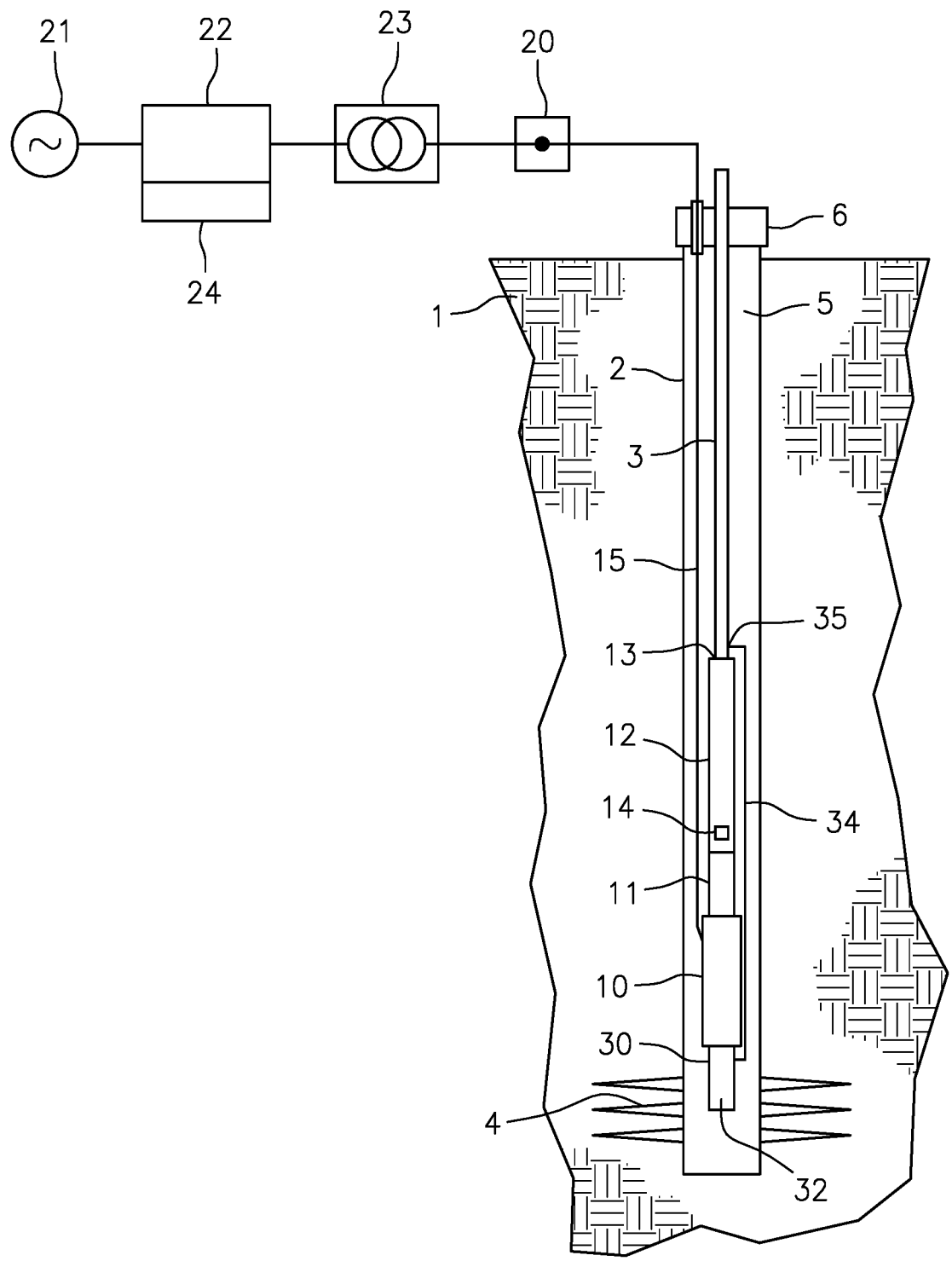
FIG. 1 is a schematic representation of a downhole pumping system including embodiments of the present disclosure.
Figure 2:
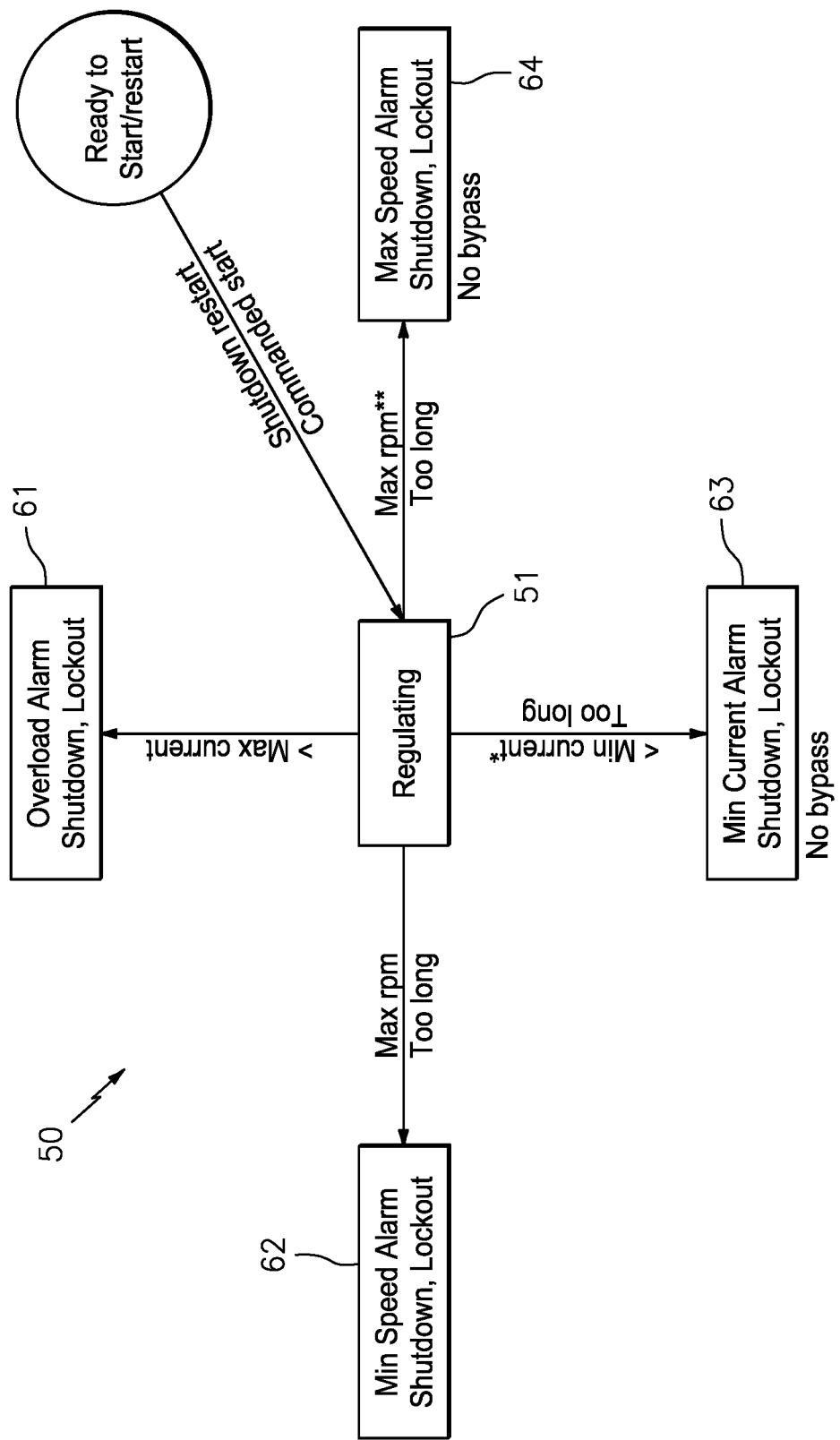
FIG. 2 is a schematic representation of a state diagram in accordance with embodiments of the present disclosure.

In accordance with an embodiment of the present disclosure, and with reference to FIG. 1, variable speed drive 22 comprises a vector drive having the capability to monitor the current supplied to motor 10 at a very high sampling rate on the order of thousands of times per second. Variable speed drive 22 can further contain logic and data comprising the operating conditions of motor 10 such as minimum speed ($RPM_{min}$), maximum speed ($RPM_{max}$), minimum current ($I_{min}$), and maximum current ($I_{max}$), among other parameters and can be configured to control the operation of motor 10. Referring now specifically to FIG. 2, and in general to FIG. 1, there is shown a high level operating state diagram of the present disclosure for a control system 50 of variable speed drive 22 for a motor 10 operating a pump 12, such as an ESP, in a wellbore 5. In such an operating environment many conditions can have an effect on the motor 10 and pump 12 as a system such as where gas may be encountered. In operation, variable speed drive 22 communicates a start command 60 to regulating unit 51. The regulating unit 51 is comprised of components and logic, as will be discussed in more detail below, as well as the capability to sense motor current and monitor the estimated motor speed. Control system 50 includes various operating parameters, limits, alarms and actions. As shown in the action boxes of alarms 61-64 alarm can simply be a graphical or sound alarm, shutdown can include an alarm and further action whereby variable speed drive 22 stops motor 10 but then may restart the motor automatically under certain conditions, such as after a time delay. Lockout can include an alarm and further action whereby variable speed drive 22 stops motor 10 but then requires manual or remote control intervention to restart the motor. Depending on the particular implementation of any embodiment the alarm, shut down and lockout can be changed or overridden by an operator. Also shown in FIG. 2 with respect to alarm 63, 64 is the "No bypass" option indicating that $I_{min}$ and $RPM_{max}$ are conditions that can cause harm to the pump 12 and/or motor 10 and as such the actions of alarm, shutdown and lockout should not be overridden in certain embodiments. The terms alarm, shutdown and lockout are known in the prior art as typical features of any alarms and actions in a drive.

If the regulating unit 51 senses that speed of the motor 10 is sensibly at or above the maximum level $RPM_{max}$ for longer than a prescribed period the Max Speed Alarm 64 is triggered, an alarm is sounded and the motor 10 is stopped. If the regulating unit 51 senses that the motor current is below $I_{min}$ for longer than a prescribed period Min Current Alarm 63 is triggered, an alarm is sounded and the motor 10 is stopped. In the case where the maximum speed $RPM_{max}$ or minimum current $I_{min}$ is maintained temporarily (less than than a prescribed period) it may be that gas had entered the pump in the pump 12 which is subsequently cleared, and control system 50 would be returned to a state of normal regulation. The corresponding alarm will be raised if the gas is not cleared from the pump quickly enough, for example the pump has become gas locked, as will be more fully described herein after, thereby preventing damage.

In a case where the regulating unit 51 senses that the motor current is above $I_{max}$ the Overload Alarm 61 is triggered, an alarm is sounded and the motor 10 is stopped. This overload alarm might also arise from debris entering the pump or a pump seizure. Similarly, if the regulating unit 51 senses that speed of the motor is below the minimum level $RPM_{min}$ for longer than a prescribed period Min Current Alarm 63 is triggered, an alarm is sounded and the motor 10 is stopped. This underspeed condition is another symptom of unexpected high loading and may be used to prevent pump damage or loss of control.

Figure 3:
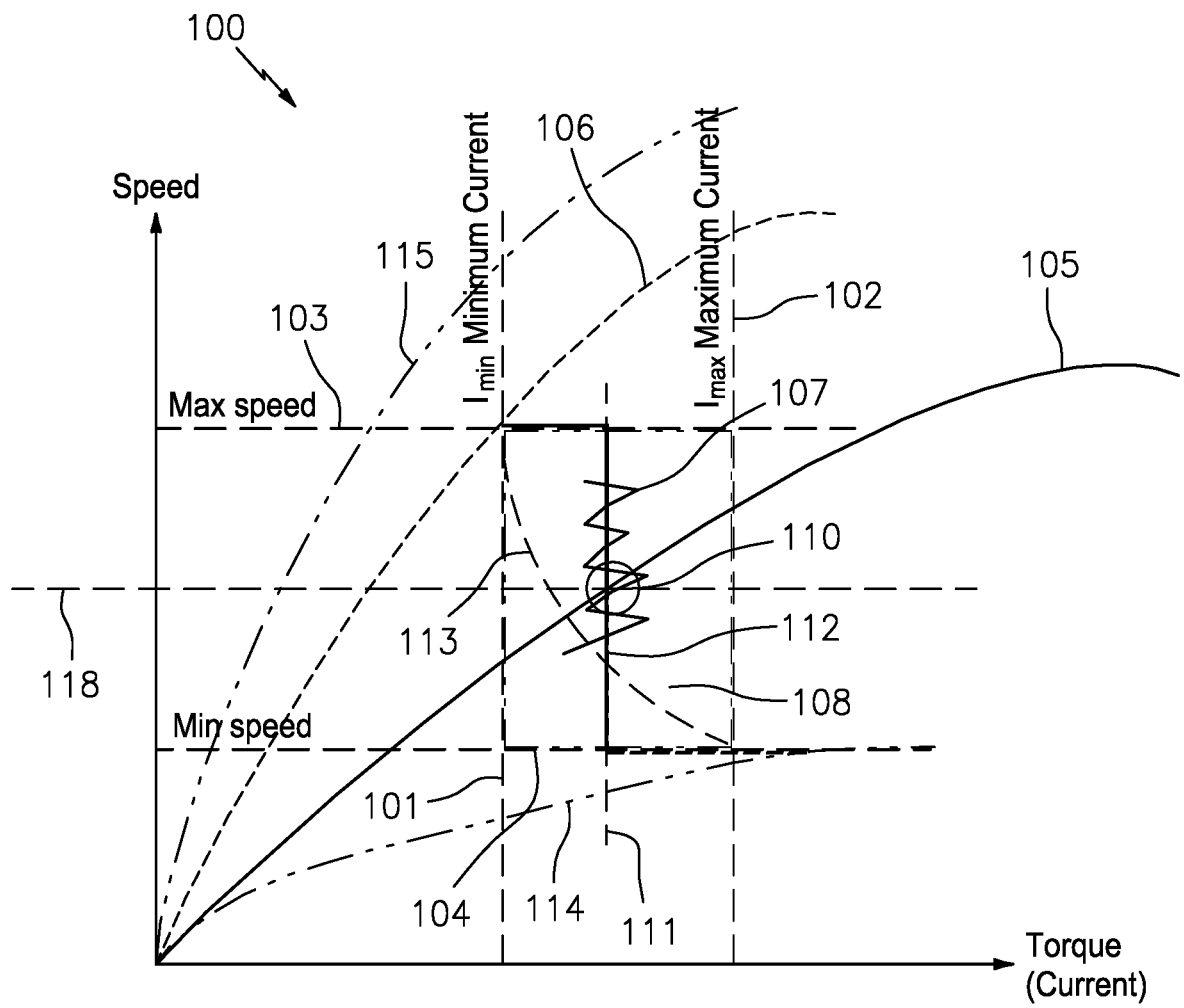
FIG. 3 is a graphical representation of a motor control method in accordance with embodiments of the present disclosure.

Referring now to FIG. 3, there is shown a graphical representation of the speed-torque plane 100 for the state diagram of FIG. 2 in terms of the pump speed and torque. In the case of a PMM, the torque is directly proportional to current ($T \propto i$), so the current alarms 61, 63 in FIG. 2 are in effect torque alarms and the abscissa in FIG. 3 can be rescaled for current. In the case of an induction motor the torque has a nonlinear relationship to the total motor current as the latter contains magnetizing current independent of torque as well as the torque-producing current. For the purposes of the present description, and with respect to induction motors, the current referred to is the torque-producing current component of the total induction motor current. The known relationship of the torque is approximated by the following: $I_{Mag}^2 + I_{Torque}^2 = I_{Motor}^2$. In vector control variable speed drive 22, the torque-producing current component of total induction motor current is automatically extracted. It should be noted that the torque-producing current component of total induction motor current can be estimated in a scalar drive as well although it is not used as part of its operation. Therefore the abscissa in FIG. 3 may conveniently be considered as either torque or torque-producing current. The minimum current 101 is the aforementioned $I_{min}$, the maximum current 102 is $I_{max}$, the maximum speed 103 is $RPM_{max}$ and minimum speed 104 is $RPM_{min}$ which all represent thresholds that are set at predetermined thresholds based on the characteristics of the well production, pump 12 and motor 10 as a system. The normal operating torque curve 105 is similarly established by the characteristics of the pump 12 and motor 10 as a system with normal production fluid. When conditions change, such as when gas enters the pump 12, less torque is required to turn the pump at the same speed, and the pump characteristic is typified by minimum torque curve 106. It will be appreciated by those skilled in the art that curve 106 will vary with gas content and is shown as illustrative of a particular gas content. For the purposes of the present disclosure, the above described alarm thresholds 61-64 (FIG. 2) establish an acceptable time-limited performance zone 108 of a pumping system and normal torque curve 105 and minimum torque curve 106 respectively pass through or touch the boundaries the performance zone. In other words, performance zone 108 is bounded by maximum speed 103 $RPM_{max}$, minimum speed 104 $RPM_{min}$ minimum current 101 $I_{min}$ and maximum current 102 $I_{max}$ and their associated alarms 61-64 shown in FIG. 2.

Figure 4:
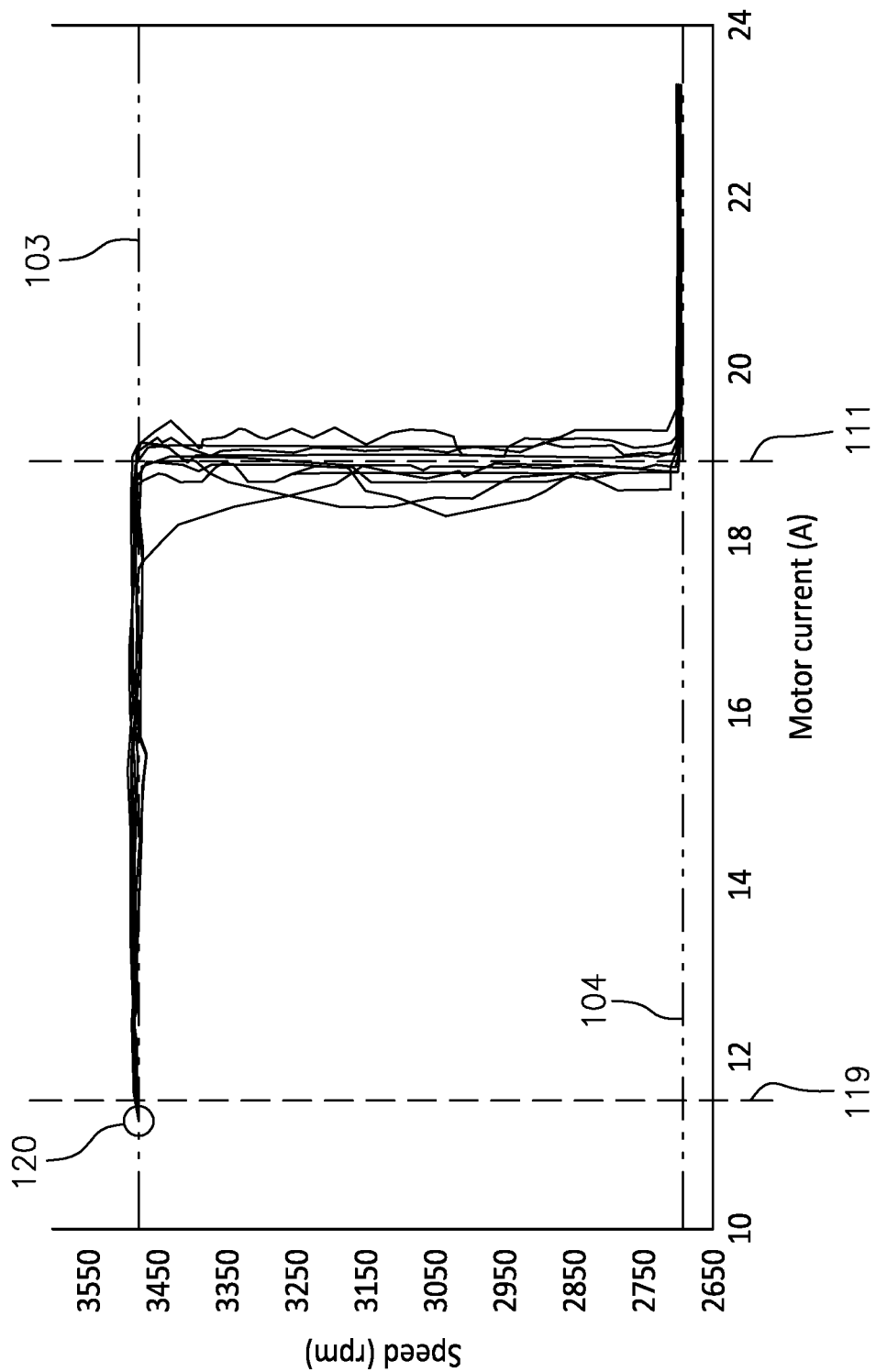
FIG. 4 is a graphical representation of a motor control method in accordance with embodiments of the present disclosure.

Now referring to FIG. 4, there is shown a portion of time-limited performance zone 108 and traces of motor speed versus current for an extended period of time. In this particular example, motor current is held constant along line 111 at approximately 19 amps and motor speed is allowed to fluctuate between RPM max 103 at approximately 3475 rpm and $RPM_{min}$ 104 at approximately 2660 rpm. As can be seen, the traces had excursions to $RPM_{max}$ 103 and $RPM_{min}$ 104 but was around line 111 for the majority of the time. Point 120 is an event where the motor 10 was stopped because as the speed hit $RPM_{max}$ 103 the current was reduced to below alarm threshold $I_{min}$ 101 and stayed there for longer than a predetermined period of time as will be described in more detail hereinafter.

In FIG. 3, point 110 is the normal operating point where the drive output current and electrical frequency matches the pump demanded torque and speed. It should be noted that a stiff current vector controller is an inherently fast and accurate current controller. It is possible to imitate the prior art use of a current regulator and scalar drive by simply setting the value of set stiff current to line 111. However, this can be problematic as even small and acceptable variations in pump torque would be set against a rigidly controlled stiff current 112, and the pump speed would rapidly vary until the torque was in balance with the supplied current. Such rapid fluctuations are undesirable for long term reliability, and may also result in frequent fluctuations triggering speed alarm thresholds. As described herein before, the present disclosure contemplates a means of tempering the inherently rigid stiff current vector controller characteristic so that speed fluctuations are less exaggerated and more analogous to the prior art scalar control and induction motor implementations, while improving the sensitivity of current to torque.

Figure 5:
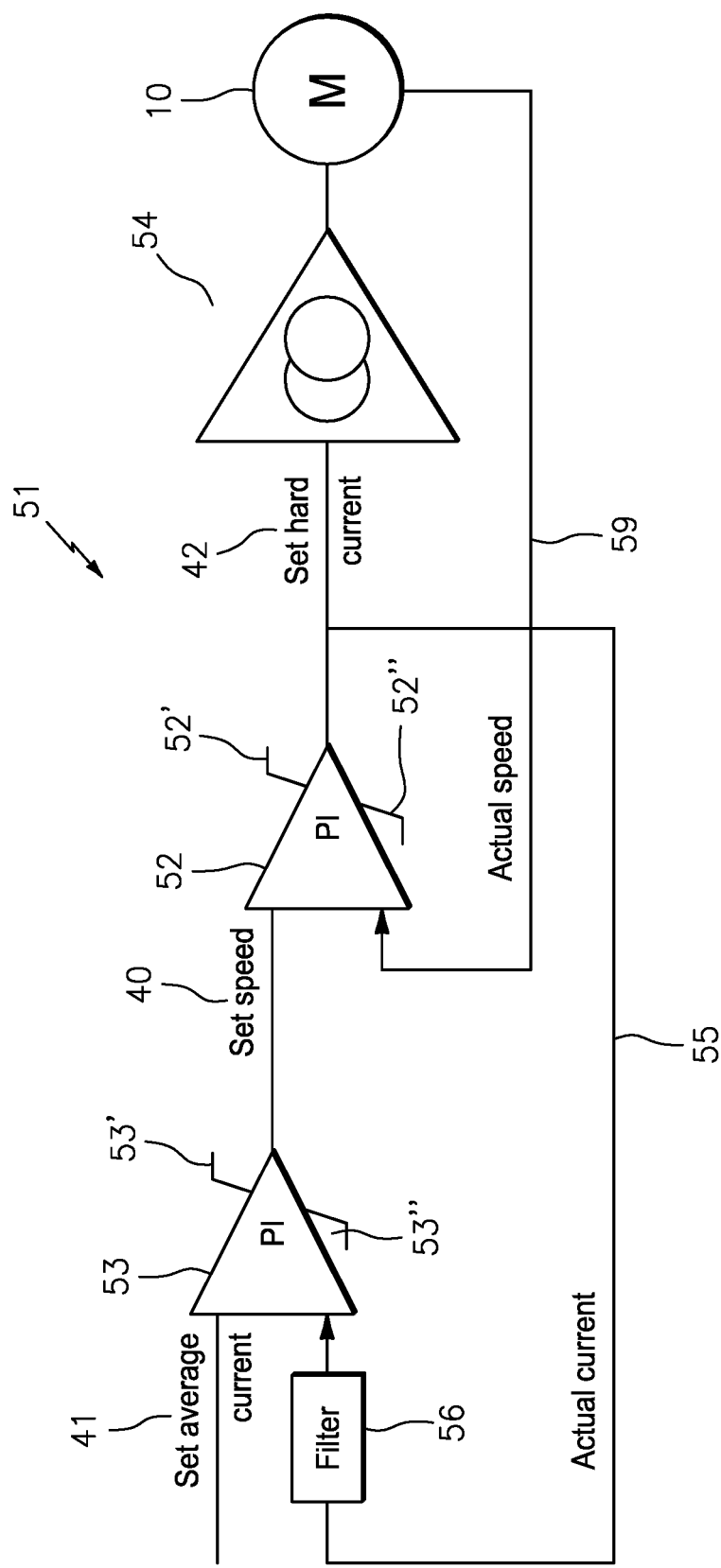
FIG. 5 is a schematic representation of a regulating unit in accordance with embodiments of the present disclosure.

It has been discovered as part of the present disclosure that a current control loop that operates at a slower rate than the above described stiff current controller, in conjunction with a speed control loop, enables the current of motor 10 to be controlled in a current control mode within acceptable performance zone 108 during periods of large fluctuations in load, such as those caused by gas being ingested into pump 12, as will be more fully described herein below. With reference to FIG. 5, there is shown an embodiment of the present disclosure that includes what can be referred to as a regulating unit 51 (also shown in FIG. 2) having a speed controller 52 and an average current controller 53. Controllers 52 and 53 may be of known proportional-integral type. Controllers 52 and 53 preferably incorporate limits 52', 52" and 53', 53" on their outputs as will be described more fully herein after. This particular embodiment is useful when motor 10 is a PMM but the embodiment is also useful with induction motors. In this particular embodiment, average current controller 53 is placed in front of speed controller 52 and feeds a dynamically computed set speed signal 40 to the speed controller. In operation, an operator selects a desired set-average-current value 41 and delivers a set average current signal as input to average current controller 53. Controller 53 computes a set-speed value and sends that signal to speed controller 52. In turn, the speed controller 52 computes a set-stiff-current which is accepted by the vector current controller 54 as a vector current value to be rapidly and accurately sent to the variable speed drive or directly to the motor. The vector current controller 53 comprises a core portion of variable speed drive 22 and together with regulating unit 51 are the major components of the variable speed drive. Average current controller 53 receives average current feedback via filter 56 from the output of speed controller 52 in the form of the set hard current signal 42. The set hard current signal 42 can be based on any one of normal operation signal, a maximum speed signal, a minimum speed signal, a maximum current signal and a minimum current signal. This current could be the actual drive output direct current measurement but in an exemplary embodiment, it has been found that the vector current controller 54 is very effective at making the drive output match the set stiff current value as hereinbefore described. Filter 56 can comprise any filter which has the capability of averaging out any rapidly changing current fluctuations output by speed controller 52 or alternatively the electrical ripples or current fluctuations from variable speed drive 22 due to changing torque demands on motor 10 and that can provide a filtered current signal, including a filtered direct current signal, to current controller 53. Such filters include known median filters, first-order infinite impulse response filters and rolling average finite impulse response filters. When average current controller 53 encounters an average current output from filter 56 that is unacceptably lower than the set average current value 41, a signal is sent to speed controller 52 increasing the value of set speed signal 40. The speed controller 52 in turn outputs a signal to increase the set stiff current 42 and receives a signal of the actual speed 59 of motor 10. The actual speed is preferably an output of a sensorless observer and not of a physical sensor attached to the motor. The speed controller 52 tuning parameters and its fast update rate of about 100 Hz operate faster than the mechanical response time of the pump 12 and its inertia. This means that speed controller 52 rapidly adjusts the set stiff current 42 to match changes in torque such that the speed is held constant, thereby eliminating the aforementioned problem of rapid speed fluctuations if only stiff current control is used in place of the controllers 52 and 53. Current controller 53 then varies the set speed at a more moderate rate in accordance with maintaining average current as described herein above. This exemplary embodiment of the present disclosure solves the problem of providing a means of average current control with vector drives and in particular with PMMs. In contrast to the prior art, the simple current regulator found in induction motor control with scalar drives sets the output frequency and voltage up or down as needed to maintain the set average current. The induction motor shaft speed slips relative to this frequency under load changes, and so it self-tempers its speed fluctuations even when the frequency is adjusted abruptly. The analogy for vector control would be to omit speed controller 52. However, the result would be unsatisfactory as the output of average current controller 53 would become the set hard current signal 42, which would be met soon after any set-average-current 41 change. The variable speed drive 22 would then behave as if only set stiff current 42 was used and so face the same problems as hereinbefore described.

Regulator unit 51 of FIG. 5 has the advantage that the average current controller 53 can have its output limits 53', 53" set to the speed limits 103 $RPM_{max}$, 104 $RPM_{min}$ in FIG. 3, and the speed controller can have its output limits 52', 52" set to the current limits 102 $I_{max}$, 101 $I_{min}$ in FIG. 3, thereby defining the operating region 108. In an embodiment output limits maximum current limit 52' and minimum current limit 52" can be set to greater than the current limit 102 $I_{max}$, and less than current limit 101 $I_{min}$. Suitable values might be the drive current limit for 52' and zero for 52". In this embodiment variable speed drive 22 uses the current alarms and not the current limits. When the speed of motor 10 increases to the maximum value 103 $RPM_{max}$, the effect of more gas in reducing torque will not result in increasing the speed to an unacceptable level, but as the speed will be capped to 103 $RPM_{max}$, the actual current will reduce. The action of average current controller 53 is roughly illustrated as line 107 in FIG. 3 to indicate that the current is averaging to the set-average-current value 41 and is updated less frequently than the inherent stiff current control 112. In principle, the current limits 101 $I_{min}$ and 102 $I_{min}$ will not be reached except as an alarm condition since the current controller 53 will keep the current sensibly on line 111 until either the maximum speed limit 53' or the minimum speed limit 53" is reached.

Another embodiment would be to omit average current controller 53 and allow the operator to directly set speed 40 and then rely on speed controller to control the speed at line 118 through point 110 (FIG. 3) and to limit the current using output limits 52', 52" set to maximum current 102 $I_{max}$ and minimum current 101 $I_{min}$ respectively. If gas were to enter pump 12 the current would reduce to minimum current 101 $I_{min}$ and may then increase in speed along line 101 until it reaches or exceeds maximum speed 103 RPM$_{max}$. Both minimum current alarm 63 and maximum speed alarm 64 may be triggered. The disadvantage of this embodiment is that the speed at minimum current can vary rapidly under small variations in torque along minimum current limit 101 I$_{min}$. This problem is similar to that described herein before with reference to direct use of set stiff current by the operator and fluctuations in speed along line 111.

Referring back to FIG. 3, there is shown yet another speed torque curve as low load curve 115 in accordance with the present disclosure. As can be seen, low load curve 115 is outside of time-limited performance box 108. As will now described, depending on how limits and alarms are configured, variable speed drive 22 can allow the motor 10 to intersect low load curve 115 at various points. For instance, in current control where RPM$_{max}$ is set and I$_{min}$ is set to zero (as previously described), then in normal operation current will be controlled along current line 111. When gas enters pump 12 the speed of motor 10 will rise, and can possibly reach RPM$_{max}$ 53' and with increasing amounts of gas the current will reduce and will intersect 115 along maximum speed line 103. If the system spends too much time at this point the Min current Alarm 63 will trigger. If the RPM$_{max}$ 53' is set to a very high value and minimum current limit 52' is set as I$_{min}$ limit, then as gas enter pump 12 current will reduce to minimum current line 101 and speed will increase along 101 until it intersects with low load curve 115. As a third example, if maximum speed limit 53' is set to very high value, then as gas enters pump 12 current controller 52 will drive the speed of motor 10 upwards along current line 111 until it intersects with low load curve 115. After sufficient time at this point Max Speed Alarm 64 will be triggered. Similarly, high load line 114 is the case wherein the motor is operating outside of performance zone 108, depending on how limits 52', 52", 53' and 53" and alarms 61-64 are configured, drive 22 can allow the motor 10 to intersect this curve at various points, in a manner having similar considerations to those described with respect to low load curve 115 directly herein above. Although many of the embodiments of the present disclosure have been described with regard to the efficient control of pumping systems wherein the torque-producing current decreases during an event such as gas ingestion such as with conventional ESP's. In other types of pumps, it may be possible that torque, and hence torque-producing current will increase when gas enters. In such cases it is possible to reverse the set point and feedback inputs to current controller 53 so that, for example the current controller would reduce output set speed 40 in order to maintain current. Similarly, the possibility of swapping set-point and feedback inputs to speed controller 52 is contemplated as part of the present disclosure, and as described herein above suitable configuration of the limits 52', 52" and alarm thresholds can be made. Such conditions of the present disclosure can be controlled using control schemes such as those described with high load curve 114 (FIG. 3) herein above.

Now referring to FIG. 3 and FIG. 5 in general, and FIG. 4 specifically, an example of the control system and method of an embodiment of the present disclosure is shown. As can be seen, speed limits 53' and 53" are set at RPM$_{min}$ 104 of approximately 2660 rpm and RPM$_{max}$ 103 of approximately 3475 rpm respectively current limits 52' and 52" are parked out of the way, or in other words, are allowed to be overridden. As gas enters pump 12 average current controller 53 keeps increasing set speed 40 in an attempt to hold current on line 111. If gas is still present in pump 12, the speed of motor 10 reaches 53', where it is limited, and is reduced until it reaches I$_{min}$ 101 where it intersects RPM$_{max}$ 103. As described herein above, this will trigger Min current Alarm 63 and/or Max Speed Alarm 64 depending on timing. If too much time is spent at I$_{min}$ 101 and RPM$_{max}$ 103 the motor 10 may be stopped indicated by point 120.

Figure 6:
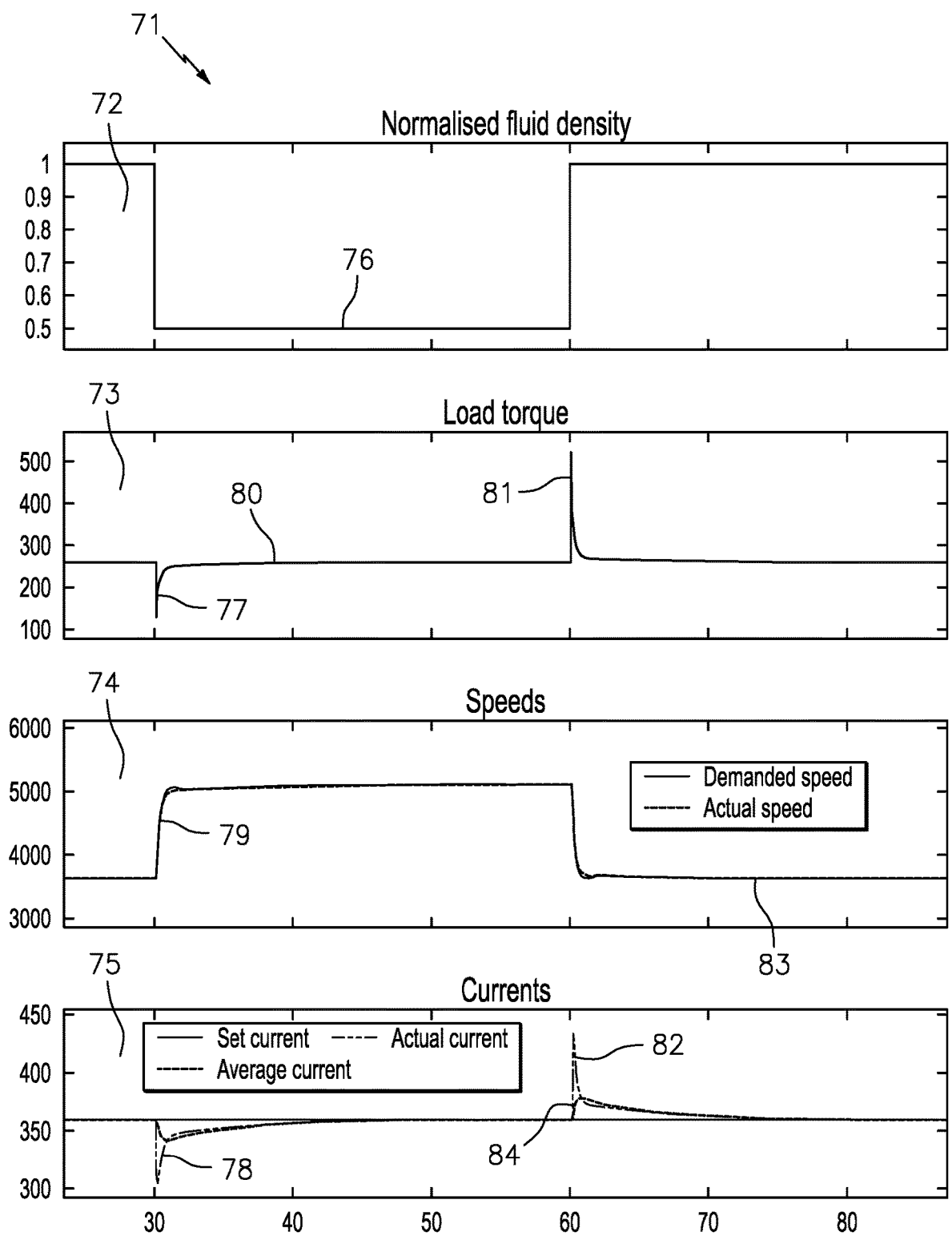
FIG. 6 is a graphical representation of a simulation of a control method in accordance with embodiments of the present disclosure.

Referring now to FIG. 6, there is shown a graphical representation of a simulation 71 of the operation of an embodiment of the present disclosure as a function of time. The condition of gas entering pump 12 is simulated in seconds in terms of fluid density 72, torque load 73, motor speed 74 and currents 75. In this example the pump is of centrifugal type and as is well known the pump torque is proportional to fluid density and to speed squared. As can be seen from the figure, the ingress of gas occurs between times 30 seconds and 60 seconds and is simulated as a reduction in the normalized density by approximately 50% shown as level 76. Upon the onset of gas at the 30 second mark there occurs an initial torque reduction in motor 10 indicated by dip 77. When gas enters the pump 12 at time 30 seconds, the speed of the motor would otherwise tend to rise quickly to restore the torque, but the speed controller 52 rapidly reduces the stiff current shown as dip 78 so that the speed does not race away as described herein above. The average current controller 53 relatively slowly (relative to speed controller 52) recognizes the reduction in current and progressively increases the speed set point. The result is that the speed increases smoothly shown as rise 79 to a steady high value that restores the torque to level 80. When the gas is flushed from the pump as shown after time equals 60 seconds, the converse applies. The torque rapidly increases as indicated by spike 81, so the stiff current 42 is increased rapidly shown as spike 82 by speed controller 52, and the average current controller 53 then progressively reduces the set speed 40 such that the speed is returned smoothly to its original value shown as level 83.

The embodiments hereinbefore described use average current control as a novel method to allow the pump speed to vary between normal operation and a speed that may flush gas from the pump. In reference to the speed-torque plane in FIG. 3, another embodiment of the present disclosure includes controlling pump power. In certain embodiments, when the pump shaft power is controlled to a nominally fixed value, then when gas enters the pump 12, the pump speed must increase to absorb the power. It should be noted that speed and torque are independent but by definition shaft power is their product speed times torque. In this particular embodiment, power control requires the speed to be controlled as set power divided by actual torque, or the torque to be controlled as set power divided by actual speed. With respect to the average current regulator 53 the controlled torque can be substituted by the equivalent torque-producing motor current as set average current 41. The character of an embodiment of the present disclosure employing constant power control mode is that rather than holding a steady average current and letting the speed of motor 10 vary along line 111 of FIG. 3, the speed of the motor, and pump thereby, varies on average along line 113 in performance zone 108 from higher speed and lower current to lower speed and higher current and in some instances the shape of line 113 can take the form of a hyperbola.

Figure 7:
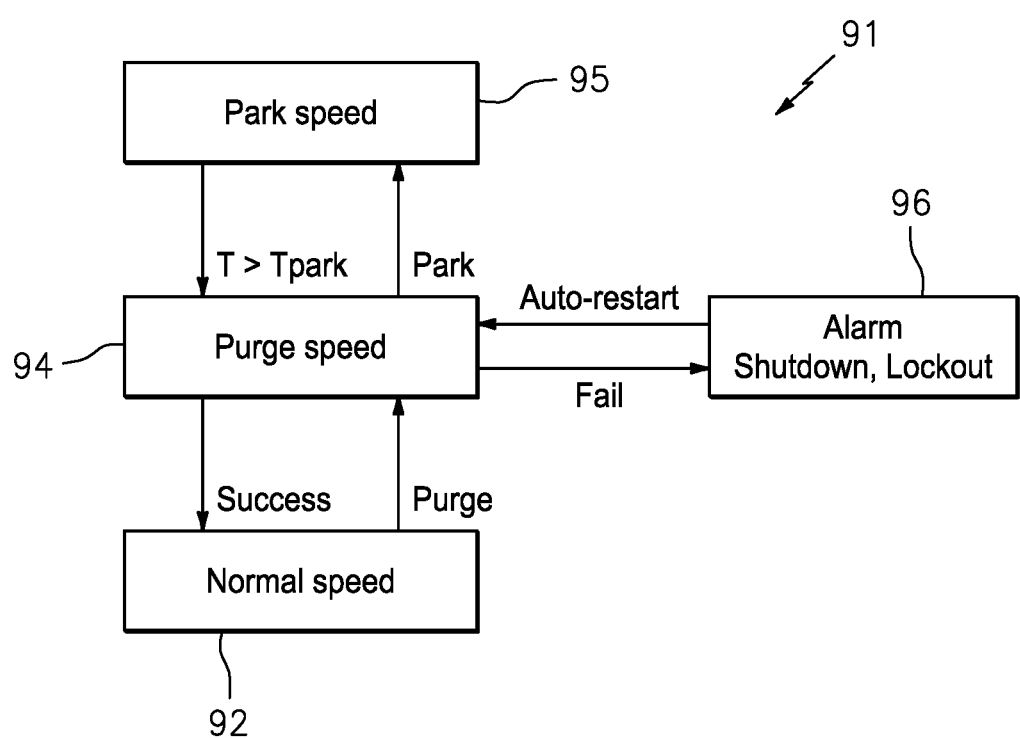
FIG. 7 is a schematic representation of a state diagram in accordance with embodiments of the present disclosure.

Referring now to FIG. 7, there is shown a state diagram 91 of an alternative embodiment of the present disclosure for speed control mode in which only speed control is used and advantageously the sensitive and fast response of torque-producing current to control motor 10 when gas enters pump 12. In this particular embodiment, the need for additional controllers, such as average current controller 53 (FIG. 5), is avoided. The method of this particular embodiment directly exploits the favorable characteristics of vector control variable speed drive 22 and in some embodiments includes motor 10 that comprises a PMM. Vector control variable speed drive 22 is comprised of speed control, such as speed controller 52 (FIG. 5). In operation, set speed 40 is normally commanded by an operator at normal speed 92. This embodiment of the present disclosure controls the set speed 40 between that normal speed 92 commanded by the operator, a maximum speed $RPM_{max}$ denoted as Purge speed 94 and a low speed $RPM_{min}$, denoted as the Park speed 95. During normal operation, pump 12 is operating at point 110 in FIG. 3. In this particular embodiment, the speed is being controlled by speed controller 52 and the motor actual current may be varying due to changes in load along line 118 (FIG. 3). If the current reduces to a minimum value $I_{min}$ 101, the controller 22 can sense that gas has entered the pump 12, and speed controller 52 switches the speed of motor 10 to the Purge speed 94 in a "purge speed cycle" in an attempt to restore the pump head and let it flush gas through the pump. If motor 10 spends too long, or longer than a predetermined time, at the Purge speed, vector control variable speed drive 22 determines that the gas cannot be purged, and then speed controller 52 switches to a low Park speed 95, which in certain circumstances can allow the fluid column to drop back through the pump 12, flushing the gas back into the wellbore 5. It should be noted in this embodiment that, while in the in the park speed cycle, i.e. at Park speed 95, the motor 10 is advantageously not stopped, which is beneficial for reliability of components and maintenance of some production of fluid. If at Park speed 95 the motor current rises again, vector control variable speed drive 22 determines that the park cycle has been successful in flushing the gas from the pump 12 and the speed is optionally returned to normal speed 92 (not shown) or to Purge speed (94). If vector control variable speed drive 22 determines that the time at Park speed 95 (park cycle) is not successful in back-flushing the gas, speed controller 52 controls the motor to reset to Purge speed 94 (Purge cycle). If after a predetermined number of Purge-Park cycles the gas has not been removed, an alarm 96 is sounded.

In certain embodiments, and rather than rely entirely on current, other sensors that can provide information on certain operating parameters, in particular pump intake pressure sensors, can be included. If pump 12 is not lifting fluid quickly enough, the intake pressure will increase. Therefore, an intake pressure threshold $P_{imax}$ can be used as an additional parameter upon which to base changes in operating speed states between normal, park and purge. Other sensors that can provide data about operating parameters can include temperature sensors, gas detectors, resistivity sensors, flow meters, accelerometers and vibration sensors.

In particular embodiments of the present disclosure wherein motor 10 is comprised of a PMM, vector control variable speed drive 22 advantageously includes the capability of to switch the set speed 40 of speed controller 52 and the motor thereby directly to the Purge speed 95 or Park speed 94, based on the high sensitivity in a PMM of current to torque which gives immediate warning of gas. Early detection of gas and switching to the purge cycle 94 gives a very good chance of flushing the gas through the pump 12 and prevents pump performance degradation caused by gas interference leading to a complete gas lock. In addition, current controller 53 can be configured to switch between limits 53', 53" and between purge cycle 94 and park cycle 95 respectively as a means of achieving the gas flushing method contemplated by FIG. 7.

A further benefit of Park speed is that production of fluids through pump 12 is continuous, albeit at a lower than normal rate. It will be appreciated that with respect to average current control or average power control as hereinbefore described, FIG. 5 may be amended to include an option to switch to a Park speed 95 after too long at maximum speed $RPM_{max}$ 103 or minimum current $I_{min}$ 101, instead of triggering alarms 63, 64. As in connection with FIG. 7, after a predetermined time in Park speed 95 the regulating unit 51 will resume normal operation, and if the cycle returns it to Park speed 95 too many times, vector control variable speed drive 22 will stop motor 10 for later restart.

Although the foregoing examples have focused on downhole pumping systems comprising ESP type pumps the present disclosure is not limited thereto. For instance, many prior art pumps also encounter gas ingestion that cause deleterious effects that can benefit from the inventive aspects of the present disclosure. Such prior art pumps include progressive cavity pumps (PCPs) which can overheat in the presence of too much gas. The method of the present disclosure is sensitive to torque versus current and enables the control of motor 10 in the presence of gas by looking at potentially small changes in torque from reduced discharge pressure (gas in tubing reduces density) in the presence of significant friction torque. The apparatus and methods of the present disclosure further enable the determination of other operating parameters of a pump 12 and motor system that have heretofore been impossible without the sophisticated sensing systems. For instance, with known downhole gauges comprising a pressure sensor system a measurement of differential pressure across the pump may be obtained. The observer within vector control variable speed drive 22 itself has measurements of speed and torque from the torque-producing current, and hence pump power from the product of torque and speed. The differential pressure is directly proportional to pump head and a fluid density. The present apparatus and methods can therefore, using known pump head and power performance curves provide dynamic estimates of a density and flow rate of the fluids travelling through pump 12. Importantly, a change in estimated fluid density can give a further signal indicating gas. Since gas compresses as it passes through the pump, the estimate of fluid density is a timely mean indicator of a change in density only, although more sophisticated calculations might be employed, As an example, and with regard to FIG. 6, vector control variable speed drive 22 might switch to the purge/park speed because the estimation of such operating parameters as lower fluid density, and with regard to FIG. 5 vector control variable speed drive 22 might shorten the allowed time or increase the average current set-point 41. In any case, embodiments of the present disclosure enable a plurality of other observations and estimates that can be used to change the control system state of the pump 12 and motor 10 system.

An improve scalar drive for induction motor is also contemplated by the present disclosure similar to the described herein before with reference to FIG. 5. In this particular embodiment the aforementioned torque producing current is given as an input to current controller 53 and the current controller outputs a frequency to the scalar drive based on that input. In this embodiment the limits 53', 53" are frequency limits.

While the foregoing is directed to embodiments of the present invention, other and further embodiments of the invention may be devised without departing from the basic scope thereof, and the scope thereof is determined by the claims that follow.

What is claimed is:

1. A downhole pumping system comprising:
   a pump;
   a motor configured to operate the pump;
   a variable speed drive including a vector current controller configured to control an operation of the motor;
   an observer comprising an electrical model of the motor configured to provide an estimate of at least one operating parameter of the motor;
   a regulating unit wherein the regulating unit comprising:
      an average current controller configured to receive a set average current signal and to produce a set speed signal;
      a speed controller configured to receive the set speed signal and a speed of the motor and to produce a set hard current signal; and
      a filter configured to receive any of the set hard current signal, a motor current, a direct current and a torque producing current and to produce a filtered signal and to communicate the filtered signal to the average current controller; and
      wherein the speed controller is configured to communicate the set hard current signal to the vector current controller;
   wherein the regulating unit is configured to receive a current of the motor and to monitor the estimate of at least one operating parameter of the motor, wherein the regulating unit is configured to communicate a signal to the vector current controller;
   wherein the variable speed drive is configured to control the operation of the motor based on the signal from the regulating unit; and
   wherein the signal is any of a normal operation signal, a maximum speed signal, a minimum speed signal, a maximum current signal and a minimum current signal.

2. The downhole pumping system of claim 1 further comprising a maximum speed limit, a minimum speed limit, a maximum current limit and a minimum current limit wherein the maximum speed limit, the minimum speed limit, the maximum current limit and the minimum current limit define a performance zone and wherein the variable speed drive is configured to control the motor to remain within the performance zone.

3. The downhole pumping system of claim 2 wherein the regulating unit is configured to trigger an alarm if any one of the maximum speed limit, the minimum speed limit, the maximum current limit and the minimum current limit is maintained for greater than a predetermined period of time.

4. The downhole pumping system of claim 1 wherein the average current controller includes a minimum speed limit and a maximum speed limit, and wherein the speed controller includes a minimum current limit and a maximum current limit.

5. The downhole pumping system of claim 4 wherein the variable speed drive is configured to control the operation of the motor between either of the minimum speed limit and the maximum speed limit, or the minimum current limit and the maximum current limit.

6. The downhole pumping system of claim 5 wherein the variable speed drive is configured to stop the motor if an alarm is triggered.

7. The downhole pumping system of claim 5 wherein the variable speed drive is further configured to control the motor at any of a purge speed and a park speed.

8. The downhole pumping system of claim 1 wherein the at least one operating parameter of the motor is any of a speed of the motor, a current of the motor, a torque producing current of the motor and a torque of the motor.

9. The downhole pumping system of claim 1 further comprising at least one sensor configured to provide information about the at least one operating parameter of the downhole pumping system to the variable speed drive and wherein the variable speed drive is configured to control the operation of the motor based on the information about the operating parameter.

10. The downhole pumping system of claim 9 wherein the at least one sensor is a pressure sensor system and wherein the at least one operating parameter is a differential pressure across the pump and wherein the information relates to any of a density and a flow rate of a fluid.

11. The downhole pumping system of claim 5 wherein the motor comprises a permanent magnet motor.

12. The downhole pumping system of claim 1 wherein either or both of the average current controller and the speed controller are comprised of a proportional-integral type controller.

* * * * *